(12) United States Patent
Joachimsthaler et al.

(10) Patent No.: US 11,280,640 B2
(45) Date of Patent: Mar. 22, 2022

(54) POSITION MEASURING DEVICE AND METHOD FOR OPERATING A POSITION MEASURING DEVICE

(71) Applicant: DR. JOHANNES HEIDENHAIN GmbH, Traunreut (DE)

(72) Inventors: Ingo Joachimsthaler, Traunstein (DE); Johannes Soier, Heldenstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 329 days.

(21) Appl. No.: 16/434,187

(22) Filed: Jun. 7, 2019

(65) Prior Publication Data
US 2019/0376816 A1 Dec. 12, 2019

(30) Foreign Application Priority Data
Jun. 8, 2018 (DE) .................. 10 2018 209 136.6

(51) Int. Cl.
*G01D 5/244* (2006.01)
*B23C 9/00* (2006.01)
*G01D 5/248* (2006.01)

(52) U.S. Cl.
CPC ........... *G01D 5/24476* (2013.01); *B23C 9/00* (2013.01); *G01D 5/248* (2013.01)

(58) Field of Classification Search
CPC ....... G01D 5/24476; G01D 5/248; B23C 9/00
See application file for complete search history.

(56) References Cited

U.S. PATENT DOCUMENTS

| | | | |
|---|---|---|---|
| 6,975,919 B2 | 12/2005 | Kluft | |
| 7,310,560 B2 * | 12/2007 | Altpeter | G05B 19/4061 700/61 |
| 9,046,335 B2 * | 6/2015 | Fuchs | G01B 5/008 |
| 10,105,807 B2 * | 10/2018 | Yamamoto | B23Q 17/00 |
| 2004/0031913 A1 * | 2/2004 | Drescher | G01D 5/34723 250/231.13 |
| 2005/0238043 A1 | 10/2005 | Altpeter | |
| 2015/0352679 A1 | 12/2015 | Iwata et al. | |

FOREIGN PATENT DOCUMENTS

WO WO 03023528 A2 3/2003

* cited by examiner

*Primary Examiner* — Bryan Bui
(74) *Attorney, Agent, or Firm* — Leydig, Voit & Mayer Ltd.

(57) ABSTRACT

A position measuring device includes a scale carrier with a measuring scale. A scanner is configured to generate position signals by scanning the measuring scale. A processor is configured to process the position signals into a digital position value. An interface is configured to communicate with downstream electronics. At least one collision sensor is assigned to the position measuring device, and is configured to generate analog or digital measured values from a time characteristic of which collision events are determinable. The measured values are fed to an evaluator configured to determine the collision events by evaluating the time characteristic of the measured values in a controller.

20 Claims, 4 Drawing Sheets

POSITION MEASURING DEVICE AND METHOD FOR OPERATING A POSITION MEASURING DEVICE

CROSS-REFERENCE TO PRIOR APPLICATION

Priority is claimed to German Patent Application No. DE 10 2018 209 136.6, filed on Jun. 8, 2018, the entire disclosure of which is hereby incorporated by reference herein.

FIELD

The present invention relates to a position measuring device and to a method for operating a position measuring device. In particular, the invention relates to the determination of collision events in a position measuring device.

BACKGROUND

Many processes in automation technology are based on the movement of machine parts driven by electric motors. The position of the machine parts is determined by position measuring devices. Thus, rotary encoders or angle measuring devices measure rotational movements, for example, of rotating shafts. Length measuring devices on the other hand measure linear displacements of machine parts movably arranged relative to one another.

Particularly in the case of complex systems, such as machine tools or production robots in which movements in several movement axes are possible, there is the risk of collisions. Collisions occur when a moving part strikes an obstacle in an unplanned manner. A typical example for machine tools is if the tool spindle in which a machine tool is arranged hits the workpiece to be machined or a clamping means during a positioning operation. The cause can be that the workpiece or the clamping means is not located at the position at which it should be according to the machining program, or that a movement path incorrectly leads to the collision during the programming of a machining program. In the case of production robots, the behavior is similar; in this case, for example, an incorrect movement of a robot arm or a part to be machined (or other obstacle) which is located in the movement path can trigger a collision.

In the case of collisions, rapid accelerations occur which can damage the components involved in the collision. In addition to direct damage to the machine or the obstacle, initial damage can also occur in machines which at first goes unnoticed, and only after a certain time leads to a failure of the machine. However, a correlation of the failure with a collision can then no longer be detected. For this reason, attempts are made to recognize and log collisions so that, in the event of damage, the cause of the fault or the causative agent can be identified. Also, the detection of a collision also allows preventive maintenance of the machine so that a later failure is prevented.

Thus, WO 03/023528 A2 proposes providing a separate monitoring device which detects collisions by evaluating sensor data and then transmits the sensor data to a machine control for permanent storage. In addition to an additional device, this solution also requires additional cabling effort, as well as a suitable interface with the machine control.

SUMMARY

In an embodiment, the present invention provides a position measuring device including a scale carrier with a measuring scale. A scanner is configured to generate position signals by scanning the measuring scale. A processor is configured to process the position signals into a digital position value. An interface is configured to communicate with downstream electronics. At least one collision sensor is assigned to the position measuring device, and is configured to generate analog or digital measured values from a time characteristic of which collision events are determinable. The measured values are fed to an evaluator configured to determine the collision events by evaluating the time characteristic of the measured values in a controller.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a simpler option for detecting collision events.

According to an embodiment, the invention provides a position measuring device, comprising:
- a scale carrier with a measuring scale,
- a scanner (which can also be referred to as a scanning unit or device) for generating position signals by scanning the measuring scale,
- a processor (which can also be referred to as a computational processing unit) for processing the position signals into a digital position value,
- an interface for communicating with downstream electronics,
- wherein at least one collision sensor that generates analog or digital measured values from the time characteristic of which collision events can be determined is assigned to the position measuring device; the measured values are fed to an evaluator in which collision events can be determined by evaluating the time characteristic of the measured values in a controller (which can also be referred to as a control unit or device).

In another embodiment, the invention provides a simplified method for determining collision events.

According to an embodiment, the invention provides a method for operating a position measuring device, comprising:
- a scale carrier with a measuring scale,
- a scanner for generating position signals by scanning the measuring scale,
- a processor for processing the position signals into a digital position value, an interface for communicating with downstream electronics, wherein at least one collision sensor is assigned to the position measuring device that generates analog or digital measured values, from the time characteristic of which collision events can be determined; the measured values are fed to an evaluator in which collision events are determined by evaluating the time characteristic of the measured values in a controller.

Figure 1:
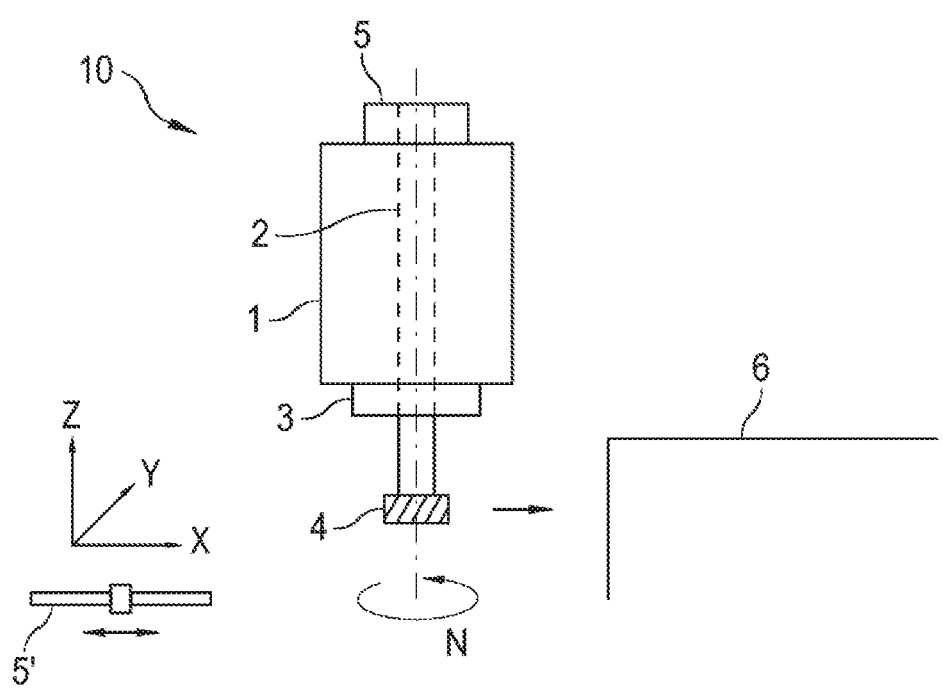
FIG. 1 a simplified illustration of a motor spindle of a machine tool.

FIG. 1 shows a motor spindle 10 of a machine tool in a simplified manner. The central component is a spindle motor 1 with a shaft 2. At one end of the shaft 2, a tool holder 3 is provided for holding a tool 4 (for example, a milling tool). Also mechanically coupled to the shaft 2 is a position measuring device 5 designed as an angle measuring device (rotary encoder). The coupling is effected via a mechanical coupling which connects a rotatable shaft of the position measuring device 5 to the shaft 2. In this way, the angular position and/or number of revolutions completed by the shaft 2 can be measured with the position measuring device 5.

During the machining of a workpiece 6, the shaft 2 rotates at a speed N, and the tool 4 is brought into contact with the workpiece 6 by moving the motor spindle 10 in a plurality of drive axes X, Y, Z. Thus, the desired contour is milled from the workpiece 6 during a milling operation, for example. In addition to the illustrated linear drive axes X, Y, Z, up to two pivot axes can also be provided, so that a movement of the motor spindle 10 (and hence tool 4) in five movement axes is possible. Further position measuring devices are provided for determining the position of the respective drive axes. FIG. 1 representatively shows a position measuring device 5' for determining the position in the direction of movement X. In this case, as is preferred for the position determination of linear drive axes X, Y, Z, the position measuring device 5' is designed as a length measuring device. By contrast, angle measuring devices are preferably used for determining the position of pivot axes.

Especially in the positioning of the tool 4 at the starting position of the machining operation, there is now the risk of a collision. During the positioning, this is particularly critical because high displacement speeds are used here in order to minimize the machining time of the workpiece 6. Collisions can take place between the tool 4 or any point of the outer contour of the motor spindle 10 with the workpiece 6 or with clamping means which serve to fix the workpiece 6 to a machine table of the machine tool.

Due to the mechanical coupling of the position measuring devices 5, 5' to moving machine components (for example between the shaft 2 and the position measuring device 5), collision events are also transmitted to the position measuring devices 5, 5'.

Figure 2:
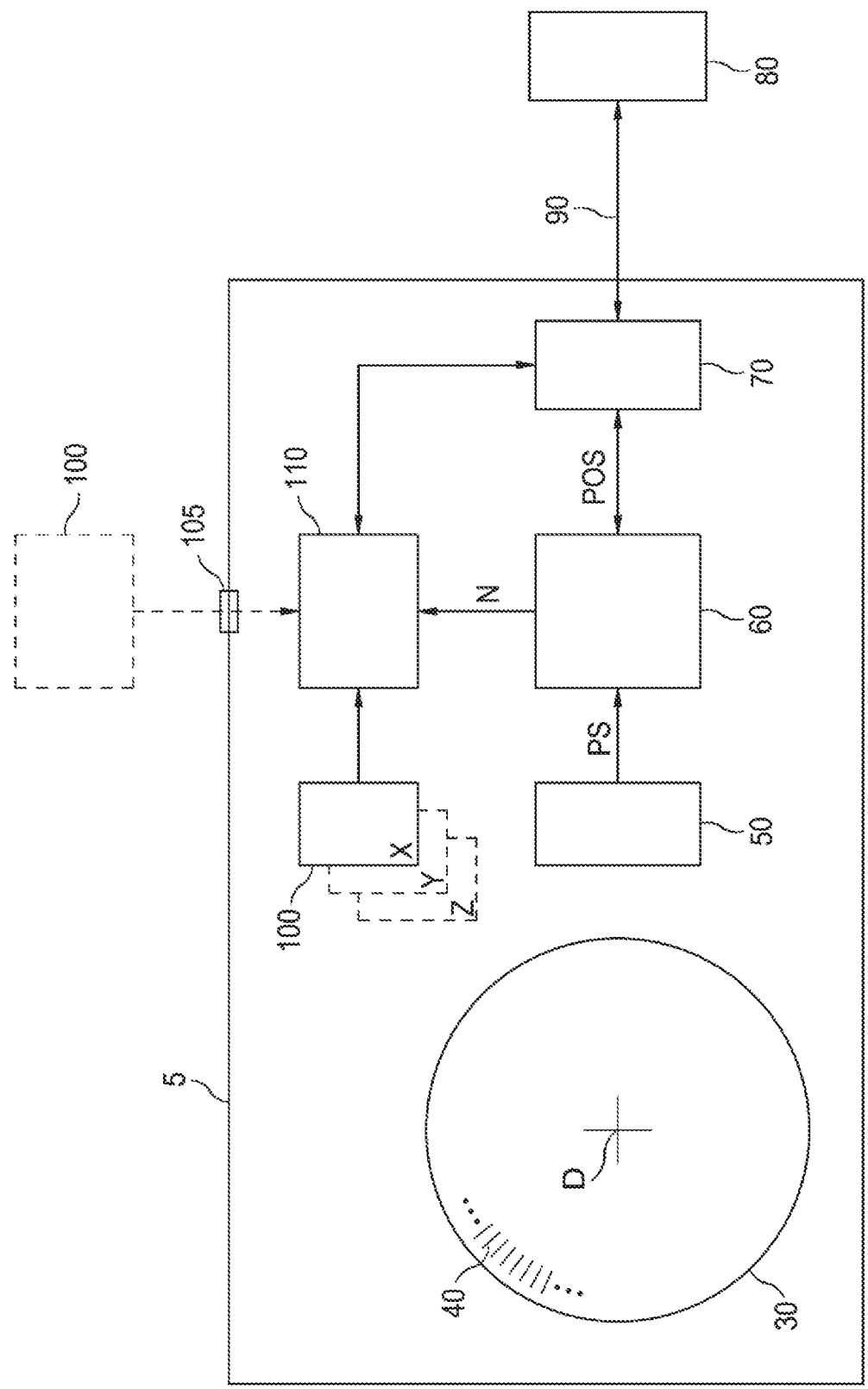
FIG. 2 a block diagram of a position measuring device according to an embodiment of the invention, FIG. 3 a timing diagram of the acceleration curve of a collision event, FIG. 4 a first embodiment of an evaluator (which can also be referred to as an evaluation unit or device), FIG. 5 a further exemplary embodiment of an evaluator, and FIG. 6 a further exemplary embodiment of an evaluator.

FIG. 2 shows a block diagram of a position measuring device 5 according to the invention. It comprises a scale carrier 30 with a measuring scale 40, a scanner 50, a processor 60 and an interface 70.

The scale carrier 30 has an annular or circular disk design and is rotatably mounted about a pivot point D for the operation of the position measuring device 5 and is joined to the shaft 2 in a rotationally fixed manner, the angular position of which and possibly the number of revolutions completed are to be measured with the position measuring device 5. The measuring scale 40 is arranged radially about the pivot point D and has at least one scale track, the scanning of which allows a position determination (angle determination).

The scanner 50 is arranged to be stationary with respect to the scale carrier 30 and is suitably configured to scan the measuring scale 40 on the scale carrier 30 and to generate position-dependent (angle-dependent) position signals PS as a function of the angle of rotation of the scale carrier 30. The position signals PS may include analog or digitally encoded signals.

The present invention is not limited to any physical scanning principle. Inductive, photoelectric, magnetic or capacitive scanning principles, which are known per se, can thus be used.

The position signals PS are supplied to the processor 60 which processes them into a position value POS and outputs them to the interface 70. The processing is not discussed further here; it is possible to carry out processing steps such as signal correction, demodulation, digitization, etc.

In addition to position values POS, further movement values, such as rotational speed N (angular velocity), acceleration or jerk can also be derived in the processor 60 from the position signals PS. They can be supplied via the interface 70 or, as will be shown later in reference to FIGS. 5 and 6, serve for internal use in the position measuring device 5.

The interface 70 is for communicating with downstream electronics 80 via a communication channel 90. The interface 70 can be designed as a serial interface, i.e. the data transmission is carried out via the data transmission channel 90 in the form of serial data streams or data packets. The interface 70 is advantageously designed to be bidirectional, so that data D, in particular position values POS and possibly other movement values, can be transmitted to the downstream electronics 80, and data D, in particular parameters PAR, can be received from the downstream electronics 80.

According to the invention, at least one collision sensor 100 and one evaluator 110 for determining collision events based on the measured values of at least one collision sensor 100 are then assigned to the position measuring device 5.

Acceleration sensors or structure-borne noise sensors, i.e. collision sensors 100 with which accelerations can be measured, are particularly suitable for determining collision events, because collisions always also lead to spontaneous changes, in particular a reduction, of a movement speed (negative acceleration).

A particularly advantageous arrangement results if a collision sensor 100 is provided for each spatial direction X, Y, Z, because conclusions about the angle of incidence of a collision can then be drawn from the measured values of the individual sensors.

The collision sensor 100 can advantageously be arranged, as indicated by the dashed lines, outside of the position measuring device 5 at a point at which it is mechanically rigidly coupled to the shaft 2, for example via a rotary bearing of the spindle motor 1. In this case, the electrical connection of the collision sensor 100 can be effected via a suitable connection unit 105 on the housing of the position measuring device 5 by means of a plug, screw, clamping or soldered connection.

However, due to the fact that collision events always act directly on the position measuring device 5 due to the mechanical coupling of the position measuring device 5 to the shaft 2, it is regarded as particularly advantageous to arrange the collision sensor 100 within the housing of the position measuring device 5. This eliminates any effort in connecting the collision sensor 100 to the position measuring device 5 and also for mounting the collision sensor 100 for coupling to the shaft 2 of the spindle motor 1 (or another suitable mechanical component of the motor spindle 10). Within the housing of the position measuring device 5, the collision sensor 100 can be arranged on a printed circuit board, for example, together with further electronic and electromechanical components. It is also possible to arrange the collision sensor 100 on a mechanical component which has a mechanically particularly stiff coupling to the shaft 2, for example a pivot bearing or the coupling.

The evaluator 110 serves to detect measured values of the at least one collision sensor 100 and to evaluate at least one parameter of a collision event with respect to the occurrence. Parameters of collision events include, for example:

the spontaneous occurrence of an acceleration or the exceeding of a limit value for the acceleration, or a spontaneous change of an acceleration or the exceeding of a limit value for the change in acceleration.

Alternatively, a length measuring device (position measuring device 5 in FIG. 1) can also be implemented according to the invention. Compared to an angle measuring device (rotary encoder), the scale carrier in a length measuring device is a straight measuring stick on which the measuring scale is arranged. For position measurement, a scanning head is guided linearly along the measuring stick or the measuring scale, wherein the scanner 50, the processor 60, the interface 70, at least one collision sensor 100 and the evaluator 110 can be arranged in a housing of the scanning head.

Figure 3:
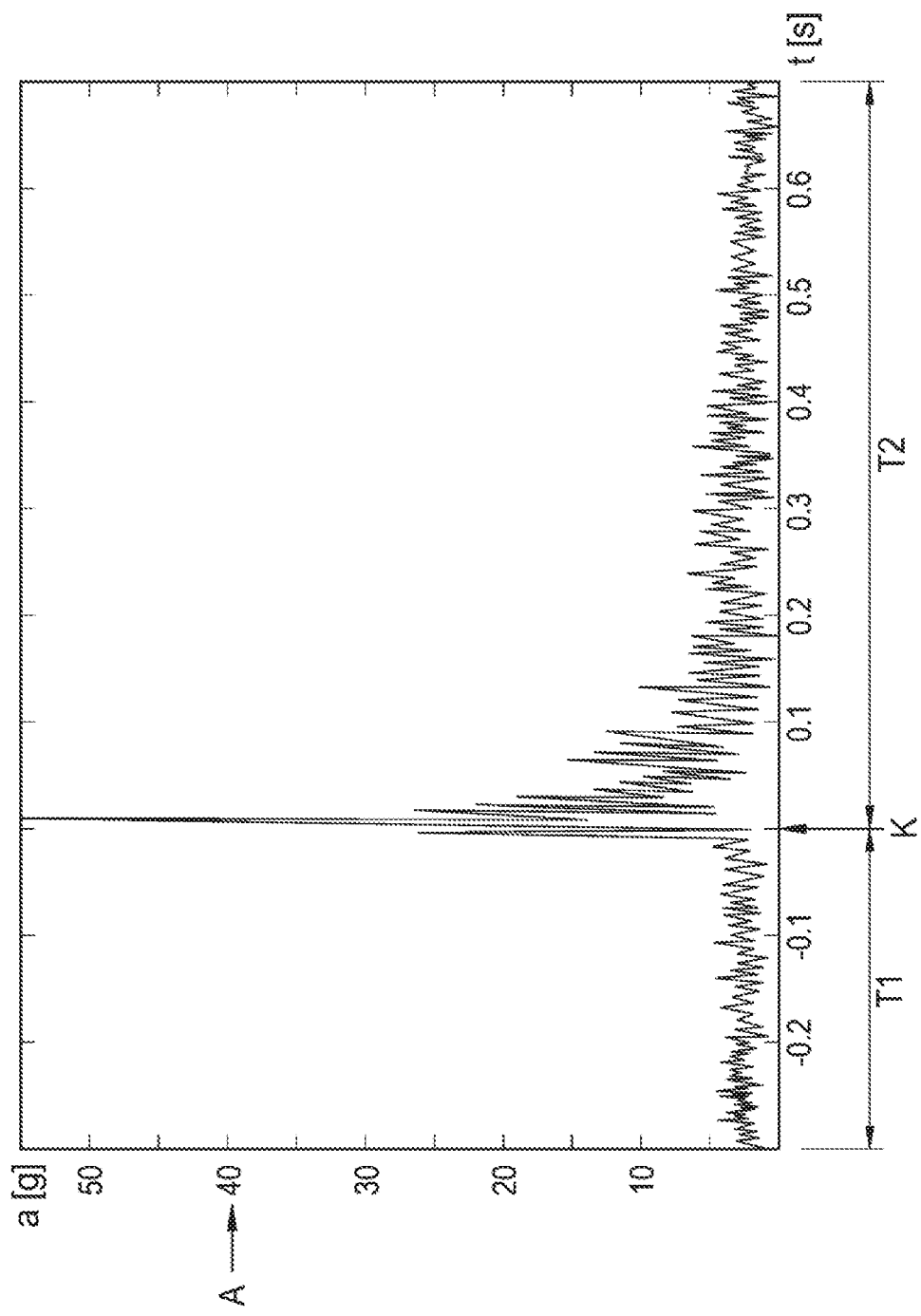

FIG. 3 shows an exemplary time characteristic of a collision event. The signal curve before the collision is shown in a first time period T1, and the signal curve after the collision is shown in a second time period T2.

The collision occurs at instant K and is detected by evaluator 110. The detection occurs upon the occurrence/exceeding a parameter of collision events, e. g. exceeding a maximum acceleration A. Because the actual instant of the collision (i.e. the point in time of the first mechanical contact) and the instant of detection of the collision event follow one another very closely, these instants will not be distinguished in the following and will simply referred to as a collision instant K.

In the first time period T1 before the collision, the signal shows only statistical changes in acceleration (signal noise). The collision causes a spontaneous increase in the acceleration which exceeds the maximum acceleration A at the collision instant K, so that the collision event is detected by the evaluator 110.

In the second time period T2, the vibration produced by the collision decreases until, towards the end of the second period T2, the signal again exhibits the behavior before the collision.

Figure 4:
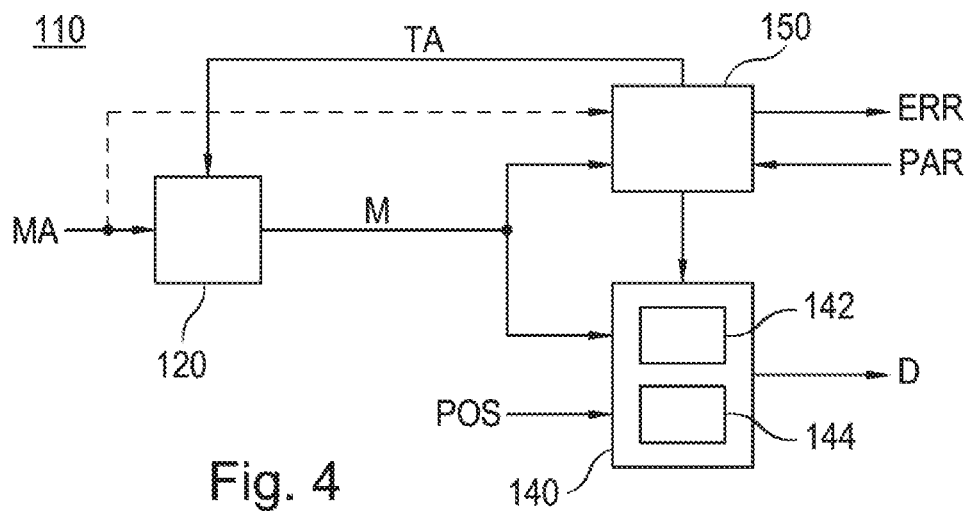

In this regard, FIG. 4 shows a first embodiment of an evaluator 110. It is suitable for processing and evaluating the measured values of analog collision sensors 100.

The analog measured values MA of the collision sensor 100 are supplied to an A/D converter 120 which digitizes the analog measured values MA. The resulting digital measured values M are supplied on the one hand to a storage unit 140 and on the other hand to a controller 150.

The controller 150 controls the essential processes in the evaluator 110. In this way, it supplies the A/D converter 120 with a sampling clock signal TA which defines the sampling rate with which the analog measured values MA are digitized. Likewise, it controls the storage of the digital measured values M in the storage unit 140. Moreover, it is suitably configured to detect collision events.

During operation of the evaluator 110, the analog measured values MA of the collision sensor 100 are digitized continuously in the time frame of the sampling clock signal TA and stored in succession in the memory 140 (which can also be referred to as a memory unit or device). As a result, a digital image of the signal curve which is output by the collision sensor 100 is produced in the memory 140. The image is stored in a RAM memory area 142 of the memory 140. The storage capacity is selected such that at least the signal curve of a collision event can be stored. The RAM memory area 142 is operated as a ring memory, which means that, upon reaching the last memory cell of the RAM memory area 142 provided for the signal curve of a collision event, there is a jump back to the first memory cell, so that the respectively oldest measured values are overwritten.

Operation can be started by switching on the machine (and, thus, switching on the position measuring device 5 or 5'). However, operation is advantageously started or stopped via commands that are transmitted by the downstream electronics 80 to the position measuring device 5 or 5'.

The controller 150 evaluates the incoming digital measured values M with respect to at least one parameter of a collision event and responsively controls the storage of the digital measured values M in the storage unit 140. The evaluation also takes place within the time frame of the sampling clock signal TA. The incoming measured values M are checked with respect to exceeding a limit value. The frequency of the sampling clock signal TA is selected such that collision events can be reliably detected. In this case, machine parameters such as maximally occurring speeds, or accelerations in normal operation, as well as weight and weight distribution of the machine components affected by possible collisions are to be taken into account here.

Alternatively, the controller 150 can also be supplied with the analog measured values MA of the collision sensor 100 for evaluation with respect to a collision event. In this case, a transgression of the limit value can be checked by comparing the analog measured values MA to the limit value by means of a comparator.

If necessary, several limit values can be provided so that collision events of different magnitudes can be distinguished.

If the controller 150 determines a collision event at the collision instant K, it continues to store the digital measured values M over the second time period T2, and then stops the recording. The RAM memory area 142 provided for the signal curve of the collision event is dimensioned such that it comprises the first time period T1 before the collision and the second time period T2 after the collision. In addition, the controller 150 generates an error message ERR for signaling the detected collision event via the interface 70 and the data transmission channel 90 to the downstream electronics 80. The error message ERR can be transmitted in the form of at least one status bit contained in a data frame which serves to transmit position values POS during operation. However, a separate line can also be provided for this purpose. It is essential that the collision event be signaled to the downstream electronics 80 immediately after its detection, while the transmission of the data D of the associated stored signal curve can be initiated at any later point in time. In this way, the downstream electronics 80 can respond immediately to a collision event that has occurred but postpone the analysis of the event to a later point in time.

For a more comprehensive analysis of a collision event, it is advantageous to store other signal curves of available measurement values in addition to the signal curve of the digital measured values M of the at least one collision sensor 100. The position values POS can also be supplied to the storage unit 140 and stored there in parallel with the digital measured values M. In this way, a correlation between the curve of the measured values M and the position values POS can be detected in the downstream electronics 80.

If the RAM memory area 142 is designed as volatile memory which loses the memory content when power is not supplied, it is advantageous to provide a nonvolatile programmable memory area 144 (EEPROM, flash memory) in which signal curves stored in the RAM memory area 142 can be stored after the recording is completed. Because a collision on a machine tool frequently leads to an emergency shutdown, the acquired data are thus retained for later evaluation.

The storage capacity of the RAM memory area 142 and/or the programmable memory area 144 of the memory 144 is advantageously dimensioned such that a plurality of signal curves of collision events can be stored.

The above-described parameters for collision events are not unique, in particular in machine tools, i.e. they can also have causes other than collisions. In the machining of workpieces, accelerations can thus occur in the same magnitude as also occur in the case of collisions. A possible cause of such high accelerations are so-called "chatter vibrations." They arise, for example, during the milling of workpieces due to the forces which occur when the cutting edges of the milling cutter strike the workpiece and do not necessarily constitute a malfunction during machining. Compared to the pulsed acceleration curve that occurs for actual collisions (FIG. 3), chatter vibrations, because of the rotation of the milling cutter and the regular arrangement of cutting edges around the circumference of the cutter, have an oscillating curve, wherein the oscillation usually extends over several periods.

A further cause for the occurrence of high accelerations can be equipment resonances of the machine tool. Also, these are oscillating, periodic signal curves.

Due to the high computing power usually available in the downstream electronics 80, signal curves of collision events resulting from actual collisions are easily distinguishable there from those having other causes. It may therefore be expedient to transmit all signal profiles of collision events that have been recorded and stored based on the exceeding of at least one of the aforementioned parameters to the downstream electronics 80. However, to avoid unnecessary error messages or emergency shutdowns of the machine tool, it is particularly advantageous to configure the evaluator 110 in such a way that the oscillating occurrence of high accelerations which exceed parameters of collision events are excluded from consideration. For this purpose, for example, the controller 150 can be suitably designed such that such events (periodic exceeding of acceleration limit values) are recognizable, and in such cases the storage of measured values is continued. This increases the probability that a collision event which was detected because a characteristic parameter was exceeded is the result of an actual collision. The final confirmation that a collision occurred is also made here by evaluating the recorded signal curve in the downstream electronics 80.

The controller 150 is advantageously designed to be parameterizable such that at least one of the following parameters PAR can be set:
 at least one parameter of collision events that is taken into account,
 the limit value of the at least one parameter,
 the sampling rate with which measured values are digitized and stored,
 the time period T1,
 the time period T2.

The parameters PAR are advantageously set by the downstream electronics 80 via the data transmission channel 90 and the interface 70.

If more than one collision sensor 100 is provided in the position measuring device 5, 5', then the components of the evaluator 110 are also present several times as the case may be, so that the digital measured values M of the individual sensors can be processed and stored largely in parallel. The parameters PAR can also be provided per collision sensor. In addition, it is advantageous for a plurality of collision sensors 100 to store the signal curves of all collision sensors 100 as soon as the measured values M of at least one of the collision sensors 100 exceed a limit value for a collision event.

Figure 5:
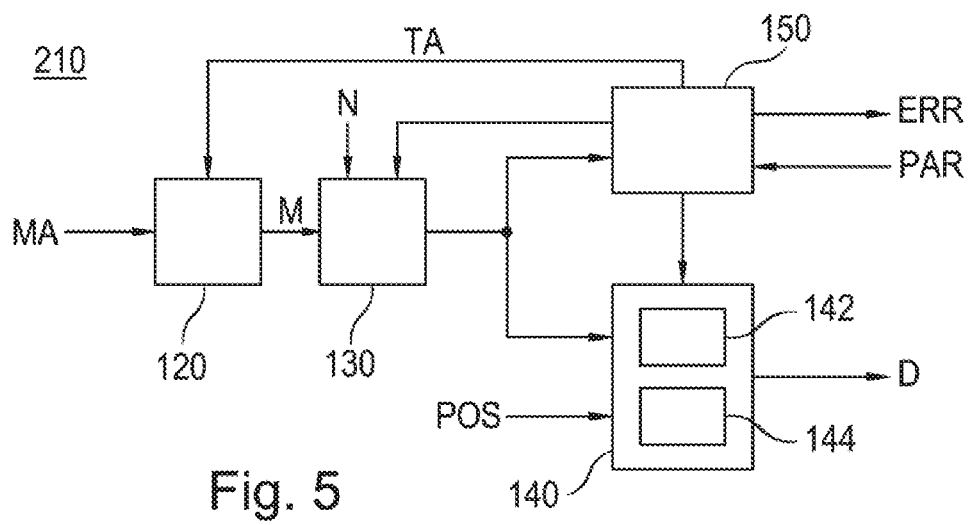

FIG. 5 shows an alternative embodiment of an evaluator 210. It is also suitable for the use of analog collision sensors 100. Components which have already been described in connection with FIG. 4 bear the same reference characters.

In addition to the previous exemplary embodiment, the evaluator 210 comprises a filter unit 130 which is arranged between the A/D converter 120 and the controller 150 or the memory 140. The filter unit 130 is configured as a band-stop filter, in particular as a notch filter, so that the frequency components of at least one frequency band of the frequency spectrum of the measured values are damped or suppressed. In this way events that cause a periodic exceeding of acceleration limit values (chatter vibrations, equipment resonances), are filtered out. Because the pulsed curve of the measured values of the collision sensor, as shown in FIG. 3, includes a very wide frequency spectrum, a check for collision events based on the detection of the aforementioned acceleration limits being exceeded can be carried out despite the filtering in the controller 150. On the other hand, one may dispense with configuring the controller 150 in such a way that it recognizes oscillating acceleration events because they are already filtered out by the filter unit 130.

The frequency band to be filtered can advantageously be set. This can be done using suitable parameters PAR which can be supplied to the filter unit 130 by the controller 150.

If a correlation exists between the frequency band to be filtered and the curve of the position values POS of the position measuring device 5, 5', then it is particularly advantageous to automatically adjust at least one frequency band to be filtered as a function of this correlation. This is the case, for example, with position measuring devices 5 which measure the angular position of the shaft 2 of the motor spindle 10 of a machine tool. As described above, the frequency of chatter vibrations results from the rotational speed N of the spindle motor 1 and the number of cutting edges of the tool 4 used. If chatter vibrations are to be filtered, then the frequency band to be filtered is determined by multiplying the speed N with a multiplier. This can be supplied to the filter unit 130 by the controller 150.

Thus, the aforementioned list of possible parameters PAR of the controller 150 can be supplemented by:
 parameters of at least one frequency band to be filtered (for example, the upper and lower limit frequency or center frequency and width of the frequency band),
 a multiplier.

The filter unit 130 in FIG. 5 is a digital filter. Alternatively, an analog filter unit may be arranged upstream of the A/D converter 120.

Figure 6:
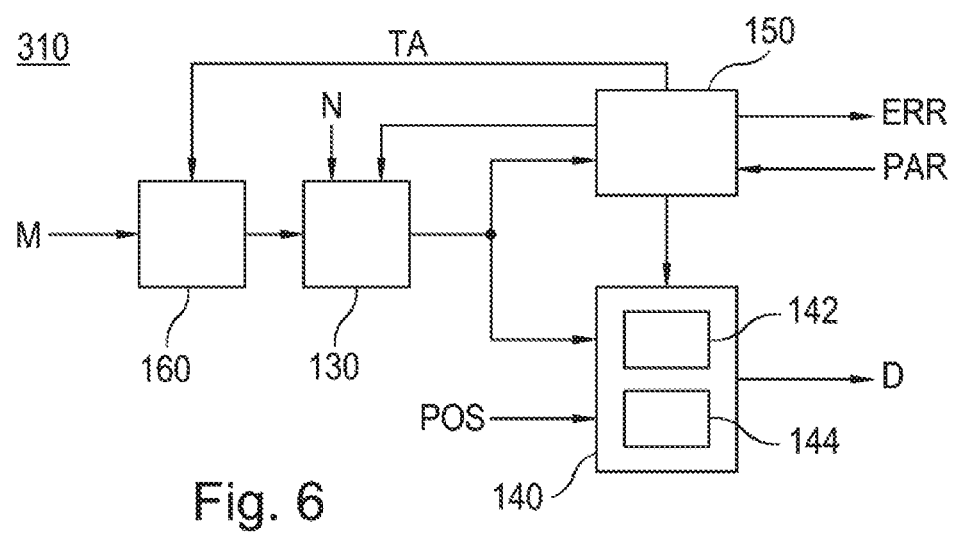

FIG. 6 shows a further embodiment of an evaluator 310. It is suitable for the use of analog collision sensors 100. Components which have already been described in connection with FIG. 4 or 5 bear the same reference numerals.

Instead of an A/D converter, a digital sensor interface 160 is provided in this exemplary embodiment in order to directly detect the digital measured values M of a collision sensor 100. The sensor interface 160 is preferably a serial interface, for example an 12C interface. If a plurality of collision sensors 100 are present, they can either be operated in a bus mode at only one sensor interface 160, but a sensor interface 160 can also be provided for each collision sensor 100.

The request for digital measured values M of the collision sensor 100 via the sensor interface 160 is also advantageously initiated in this example within the time frame of the sampling clock signal TA of the controller 150. As in the previous example, incoming digital measured values M are first supplied to the filter unit 130 before they are evaluated in the controller 150 or stored in the memory 140.

It should be pointed out that this exemplary embodiment, analogously to FIG. 4, can also be implemented without filter unit 130. In this case, the detection of oscillating acceleration events resulting from chatter oscillations or device resonances may occur in the downstream electronics 80 or in the controller 150.

The present invention is of course not limited to the described exemplary embodiments, but can alternatively be configured by one skilled in the art within the scope of the claims. In particular, in addition to or at the location of acceleration sensors or structure-borne noise sensors, other sensors can also be used with which collision events can be recognized, for example sensors with which bending or displacement of a machine part as a result of a collision can be detected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position measuring device, comprising:
   a scale carrier with a measuring scale;
   a scanner configured to generate position signals by scanning the measuring scale;
   a processor configured to process the position signals into a digital position value; and
   an interface configured to communicate with downstream electronics,
   wherein at least one collision sensor is assigned to the position measuring device, the at least one collision sensor being configured to generate analog or digital measured values and to feed the measured values to an evaluator that is configured to determine collision events by evaluating a time characteristic of the measured values using a controller, and
   wherein the measured values are taken in accordance with a sampling clock frequency, and wherein the interface is configured to communicate the position values to the downstream electronics.

2. The position measuring device according to claim 1, wherein the evaluation of the time characteristic of the measured values takes place in a time frame of the sampling clock signal.

3. The position measuring device according to claim 1, wherein the collision sensor is an analog sensor, wherein the evaluator has an A/D converter configured to form digital measured values from analog measured values evaluator, and wherein the formation of the digital measured values is controlled by the sampling clock signal which is supplied to the A/D converter from the controller.

4. The position measuring device according to claim 1, wherein the collision sensor is a digital sensor, and wherein the evaluator has a sensor interface configured to supply digital measured values of the collision sensor to the evaluator.

5. The position measuring device according to claim 1, wherein the evaluator comprises a memory which is operated as a ring memory and to which the digital measured values are supplied, and in which a plurality of digital measured values can be stored in succession in a time frame of the sampling clock signal during ongoing operation.

6. The position measuring device according to claim 5, wherein after the determination of a collision event, the storage of the digital measured values in the memory is continued in a second time period so that a signal curve of a collision event which comprises a first time period before a collision instant and the second time period after it can be stored in the memory.

7. The position measuring device according to claim 1, wherein the evaluator comprises a notch filter to which the measured values are fed, and wherein at least one frequency band to be filtered is adjustable.

8. The position measuring device claim 7, wherein the position measuring device is an angle measuring device, wherein the processor is configured to determine a rotational speed that is supplied to the notch filter, and wherein the at least one frequency band to be filtered of the notch filter is adjustable as a function of the rotational speed.

9. The position measuring device according to claim 1, wherein the at least one collision sensor is an acceleration sensor or a structure-borne noise sensor.

10. The position measuring device according to claim 1, wherein the position measuring device is mechanically rigidly coupled to a shaft at a location, and wherein the at least one collision sensor is disposed outside of a housing of the position measuring device at the location, or is disposed on a mechanical component which has a mechanically stiff coupling to the shaft.

11. The position measuring device according to claim 1, wherein the at least one collision sensor is disposed inside a housing of the position measuring device.

12. The position measuring device according to claim 1, wherein the scale carrier, the scanner, the processor, the evaluator and the controller are each disposed within a housing of the position measuring device.

13. A method for operating a position measuring device, comprising:
- scanning, by a scanner of the position measuring device, a scale carrier with a measuring scale on a scale carrier so as to generate position signals;
- processing, by a processor of the position measuring device, the position signals into a digital position value;
- communicating, by an interface of the position measuring device, with downstream electronics;
- generating, by at least one collision sensor assigned to the position measuring device, analog or digital measured values; and
- feeding the measured values to an evaluator in which collision events are determined by evaluating a time characteristic of the measured values using a controller,
- wherein the measured values are taken in accordance with a sampling clock frequency, and wherein the interface is configured to communicate the position values to the downstream electronics.

14. The method according to claim 13, wherein the time characteristic of the measured values in a time frame of the sampling clock signal is evaluated.

15. The method according to claim 13, wherein the collision sensor is an analog sensor, wherein the evaluator includes an A/D converter which forms digital measured values from analog measured values, and wherein the formation of the digital measured values is controlled by the sampling clock signal which is supplied to the A/D converter from the controller.

16. The method according to claim 13, wherein the collision sensor is a digital sensor, and wherein the evaluator has a sensor interface via which digital measured values of the collision sensor are supplied to the evaluator.

17. The method according to claim 13, wherein the evaluator further comprises a memory which is operated as a ring memory and to which the digital measured values are supplied and in which a plurality of digital measured values are stored in succession during operation in a time frame of the sampling clock signal.

18. The method according to claim 17, wherein after the determination of a collision event, the storage of the digital measured values in the memory is continued in a second time period after a collision instant of the collision event so that a signal curve of the collision event which comprises a first time period before the collision instant and the second time period after the collision instant are stored in the memory.

19. The method according to claim 13, wherein the evaluator comprises a notch filter unit to which the measured values are fed, and wherein at least one frequency band to be filtered is adjustable.

20. The method according to claim 13, wherein the position measuring device is an angle measuring device, wherein the processor determines a rotational speed that is supplied to a filter of the evaluator, and wherein at least one frequency band to be filtered is adjusted as a function of the rotational speed.

* * * * *